United States Patent
Xu

(10) Patent No.: US 7,726,861 B2
(45) Date of Patent: Jun. 1, 2010

(54) BRIGHTNESS ENHANCEMENT WITH DIRECTIONAL WAVELENGTH CONVERSION

(75) Inventor: Li Xu, Saratoga, CA (US)

(73) Assignee: YLX Corporation, San Jose, CA (US)

( * ) Notice: Subject to any disclaimer, the term of this patent is extended or adjusted under 35 U.S.C. 154(b) by 360 days.

(21) Appl. No.: 11/831,804

(22) Filed: Jul. 31, 2007

(65) Prior Publication Data

US 2008/0144331 A1 Jun. 19, 2008

Related U.S. Application Data

(60) Provisional application No. 60/834,437, filed on Jul. 31, 2006.

(51) Int. Cl.
*F21V 7/04* (2006.01)
*F21S 4/00* (2006.01)

(52) U.S. Cl. ........................ 362/555; 362/583

(58) Field of Classification Search ............... 362/555, 362/583
See application file for complete search history.

(56) References Cited

U.S. PATENT DOCUMENTS 7,040,774 B2 * 5/2006 Beeson et al. ............... 362/84

2009/0185384 A1 * 7/2009 Anderson et al. ............ 362/326

FOREIGN PATENT DOCUMENTS

WO 2006/102846 A1 10/2006

* cited by examiner

*Primary Examiner*—Sandra L O'Shea
*Assistant Examiner*—William J Carter
(74) *Attorney, Agent, or Firm*—Chen Yoshimura LLP

(57) ABSTRACT

An LED based illumination system with enhanced brightness is described. The system includes one or more light sources such as LEDs, one or more light couplers for efficiently collecting and collimating the light from the light sources, one or more wavelength selective filters, one or more light concentrators that focus the collimated light, and a cavity made of a layer of wavelength converting material such as a phosphorescent material located at the focus planes of the light concentrators. Each light coupler includes a light tunnel portion and a compound parabolic reflecting portion, and effectively collects and collimates light emitted by the LED in all directions. The wavelength selective filters pass the collimated light from the light sources and reflect light of a second wavelength generated by the phosphorescent material. The lights of both wavelengths exit the light cycling cavity through an aperture.

17 Claims, 6 Drawing Sheets

BRIGHTNESS ENHANCEMENT WITH DIRECTIONAL WAVELENGTH CONVERSION

This application claims priority from U.S. Provisional Patent Application No. 60/834,437, filed Jul. 31, 2006, which is herein incorporated by reference in its entirety.

BACKGROUND OF THE INVENTION

1. Field of the Invention

The present invention generally relates to illumination system using a light emitting diode array and wavelength conversion.

2. Description of the Related Art

Solid-state illumination devices such as light emitting diodes have many benefits as compared with traditional illumination sources. Light emitting diodes (LEDs) have long lifetime, high energy-efficiency, pure color characteristic, good modulation performance, and shock resistant. White-light generation using blue or UV LED to excite phosphorescent materials provides a great potential for replacing traditional light source such as incandescent lamp and even fluorescent lamp.

Although multiple LEDs can linearly scale up total output lumen, the average brightness of a simple LED array can be significantly lower as compared to a single LED due to the increase of effective emitting area. Therefore, a standard LED array has difficulties in providing sufficient brightness for many applications requiring directional beam such as projection light sources and automotive headlamps. Furthermore, as the LED chip temperature increase due to the increase of driving current, the phosphorescent material directly contacting the LED chip may reduce its wavelength converting efficiency and can even be damaged by the heat.

SUMMARY OF THE INVENTION

There is, therefore, a need for the ability to efficiently collect the light from multiple LEDs, generating light with other wavelength converting material physically far away from the LED chips and to construct a light system with higher light brightness compared to an individual LED.

Accordingly, the present invention is directed to an LED illumination system with enhanced brightness that substantially obviates one or more of the problems due to limitations and disadvantages of the related art.

In an embodiment of the present invention, an LED based illumination system with enhanced brightness includes a light source such as LEDs, light couplers for efficiently collecting and collimating the light from LEDs, wavelength selective filters, light concentrators that focus the collimated light, a cavity constructed by layers of wavelength converting material such as phosphorescent materials located the focus planes of the light concentrators. The LEDs provide the light of a first wavelength (the term "wavelength" is used in this disclosure for convenience, but it should be understood to refer to a wavelength range unless otherwise clear from the context). The light couplers efficiently collect and collimate the light from the LED. Each coupler includes a light tunnel portion and a compound parabolic reflecting surface portion. Exiting LED light that is substantially perpendicular to the LED chip surface is directly applied to the compound parabolic reflector and is collimated. The LED light that is substantially parallel to LED chip surface strikes the light tunnel portion and is guided into the parabolic reflecting portion through one or multiple reflections and is also collimated. A wavelength selective filter is placed at the output of the collimated light of the first wavelength but before the light concentrator that focus the collimated light. At the focus of the concentrator is the layer of the cavity made of a wavelength conversion material. The layer of the wavelength conversion material forms a cavity that passes the focused light of the first wavelength. There is at least one aperture on the cavity to allow light at both the first wavelength and a second wavelength pass. The light at the first wavelength passing through the filters interacts with the wavelength converting material and generates the light of the second wavelength that is different from the first wavelength. The wavelength selective filters reflect the light with the second wavelength and prevent the light with second wavelength from going back to the light couplers and then back to the light source such as LEDs. Therefore the light of the second wavelength can only propagate in the forward direction and is trapped and cycles inside the cavity until it exits the cavity through an aperture on the cavity. Since the side surfaces of the cavity are form from the focus surface and the aperture is significantly smaller than 50% of total cavity area, the brightness of the output light is enhanced.

In another embodiment of the present invention, an LED based illumination system with enhanced brightness includes a cavity constructed by a layer of wavelength converting material such as phosphorescent material, light concentrators that focus the collimated LED light, wavelength selective filters, and optical fibers or fiber bundles that transport the collimated light from LEDs, and light couplers for efficiently collecting and collimating light from LEDs. The light couplers efficiently collect and collimate the light of the first wavelength from the LED. Each coupler provides a light tunnel portion and a compound parabolic reflecting surface portion. Exiting LED light that is substantially perpendicular to the LED chip surface is directly applied to the compound parabolic reflector and is collimated. LED light that is substantially parallel to the LED chip surface strikes the light tunnel portion and is guided into the parabolic reflecting portion through one or multiple reflections and is also collimated. The collimated light of the first wavelength is then collected by an optical fiber. LED output from multiple fibers can be further combined through fiber bundling or fiber fusion. A wavelength selective filter is placed at the fiber output of the collimated light of first wavelength but before the light concentrator that focus the collimated light. At the focus of the concentrator is the layer of the cavity made of the wavelength conversion material. The light of the first wavelength passes through and interacts with the wavelength converting material that generates light of a second wavelength different from the first wavelength. The light of the second wavelength that travels back to the concentrator will be reflected back by the wavelength selective filters which prevent the light of the second wavelength from going back to the fiber and then back to the LED. Further improvement of brightness is obtained from the increase of the effective light conversion efficiency since the loss of light that go back to the light source is prevented, as well as the reduction of beam spot size by the concentrator. The light of the second wavelength from the light conversion material can only propagate in the forward direction as the collimated light of the first wavelength. The light of the second wavelength can directly exit the cavity or cycle inside the cavity until exiting the cavity through an aperture on the cavity. When the reflectivity of optical components is high enough (or the loss is low), there is no significant light loss. With an appropriate size of the aperture, the output light brightness is enhanced.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides an optical illumination system which includes: one or more light sources each comprising one or more light emitting devices emitting light in a first wavelength range; coupling optics that collects and collimates the light from the light sources; one or more optical fibers or waveguides that couple the collimated light form each light source; a light cycling cavity having at least one aperture, the light cycling cavity being formed by a wavelength conversion layer that converts the light from the light sources in the first wavelength range into light in a second wavelength range that is different from the first wavelength range; a light selective filter that passes the collimated light in the first wavelength range and reflects the light in the second wavelength range; and a light concentrator that focuses the collimated light from the optical fibers or waveguides.

In another aspect, the present invention provides an illumination device, which includes: a plurality of light emitting devices each emitting light in a first wavelength range; a light selective filter that transmits light in the first wavelength range and reflects light in a second, different wavelength range, the light selective filter placed in an optical path of the light from the light emitting devices; a light concentrator placed in the optical path to receive transmitted light through the light selective filter from the light emitting devices, the light concentrator configured to focus the light at a plane displaced from the light concentrator; and a wavelength conversion layer placed at the plane to receive the focused light from the light selective filter and the light concentrator, the wavelength conversion layer operable to absorb light in the first wavelength range and to emit light in the second wavelength range, wherein the light selective filter is located between the light emitting devices and the wavelength conversion layer to reflect light in the second wavelength range towards the wavelength conversion layer.

In yet another aspect, the present invention provides an illumination device, which includes: a light emitting device emitting light in a first wavelength range; coupling optics for collecting and collimating the light from the light emitting device, the coupling optics including a compound parabolic reflector portion for collecting the light from the light emitting device and generates exit light that is substantially perpendicular to a surface of the light emitting device, and a light tunnel portion for collecting the light from the light emitting device that is substantially parallel to the surface of the light emitting device and guiding it into the parabolic reflecting portion through one or multiple reflections; an optical fiber for transmitting the collimated light form the coupling optics; and a wavelength conversion layer disposed to receive light from the optical fiber, the wavelength conversion layer operable to absorb the light in the first wavelength range and to emit light in a second, different wavelength range.

It is to be understood that both the foregoing general description and the following detailed description are exemplary and explanatory and are intended to provide further explanation of the invention as claimed.

DETAILED DESCRIPTION OF THE PREFERRED EMBODIMENTS

Figure 1:
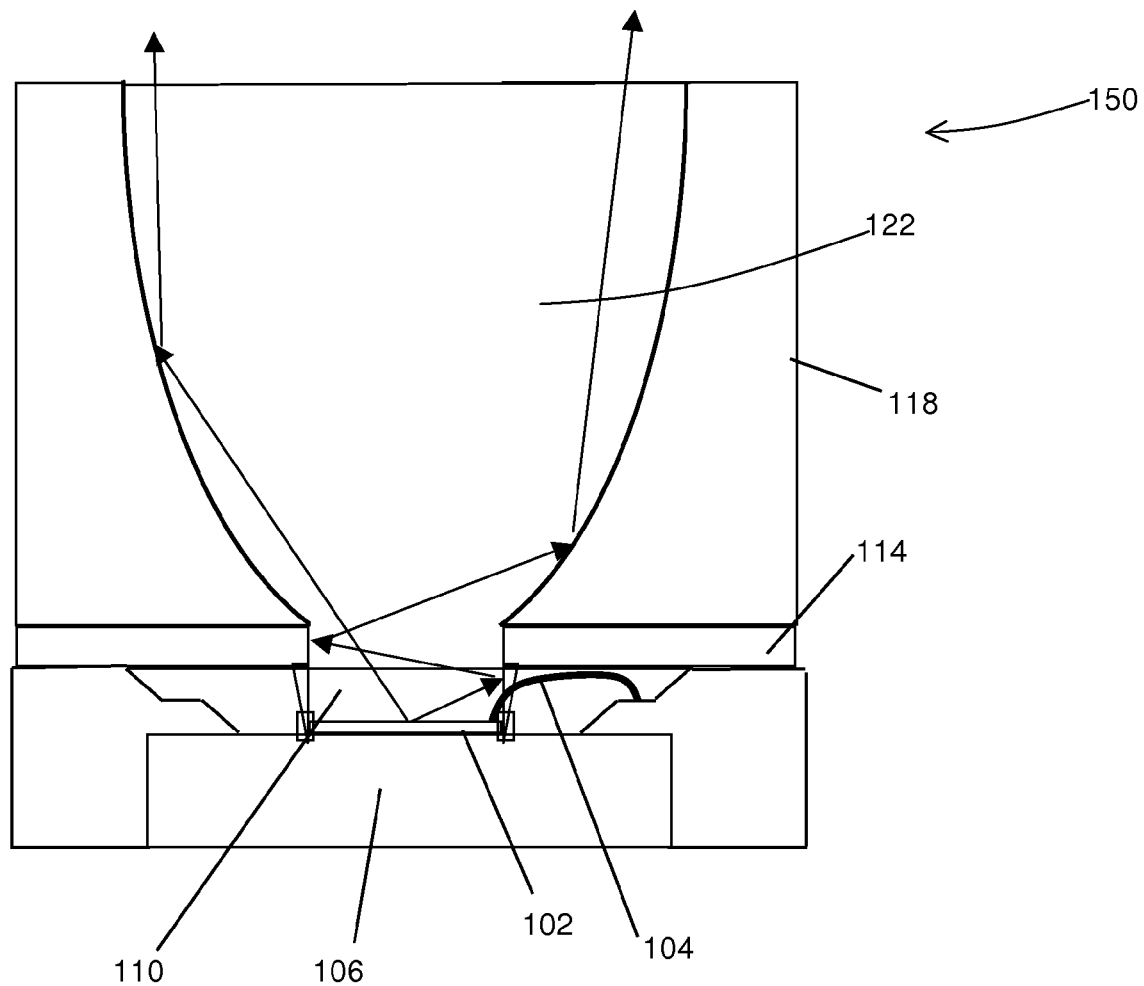
FIG. 1 illustrates a light collimation system that includes a coupler and a light source such as a LED according to an embodiment of the present invention.

FIG. 1 illustrates one embodiment of the invention which uses a light coupler for efficient colleting and collimating of light from a light source such as an LED. The LED chip 102 sits on a heat sink 106 and is covered by a transparent material 110 and emits a light of a first wavelength range. The LED 102 is driven by electrical current supplied by bonding wires 104. The light coupler has one portion which is a light tunnel 114 and another portion which has a compound parabolic reflective surface 118. The compound parabolic portion 118 is formed by molded solid transparent part. The reflection surface of the coupler has a high reflectivity (greater than 80%) for the first wavelength. The reflective surface can be coated with metal (such as Al or silver) or multi-layer dielectric coating, or the combination of both. To further improve the light escaping efficiency, the space enclosed by the light coupler can be filled with a transparent material 122 with a refractive index matching that of the transparent material 110. The part of the light emitting from the LED 102 that is substantially perpendicular to its surface is directly applied to the compound parabolic reflector and is collimated. The light from the LED 102 that is substantially parallel to its surface strikes the light tunnel portion 114 and is guided towards the parabolic reflecting portion 118 through one or multiple reflections and is also collimated. Of course the light that is close to being perpendicular to the surface of the LED 102 will exit the light coupler directly. The cross section of the light tunnel should match the shape and size of the LED 102 (which is normally a square). The light tunnel portion 113 has an open slot for bonding wires to pass. Because the light tunnel portion of the coupler can be much closer to the surface of the LED 102, large angle light from the LED 102 can be collected and collimated. This light source collimating system 150 provides a high efficient collection and collimation output.

Figure 2:
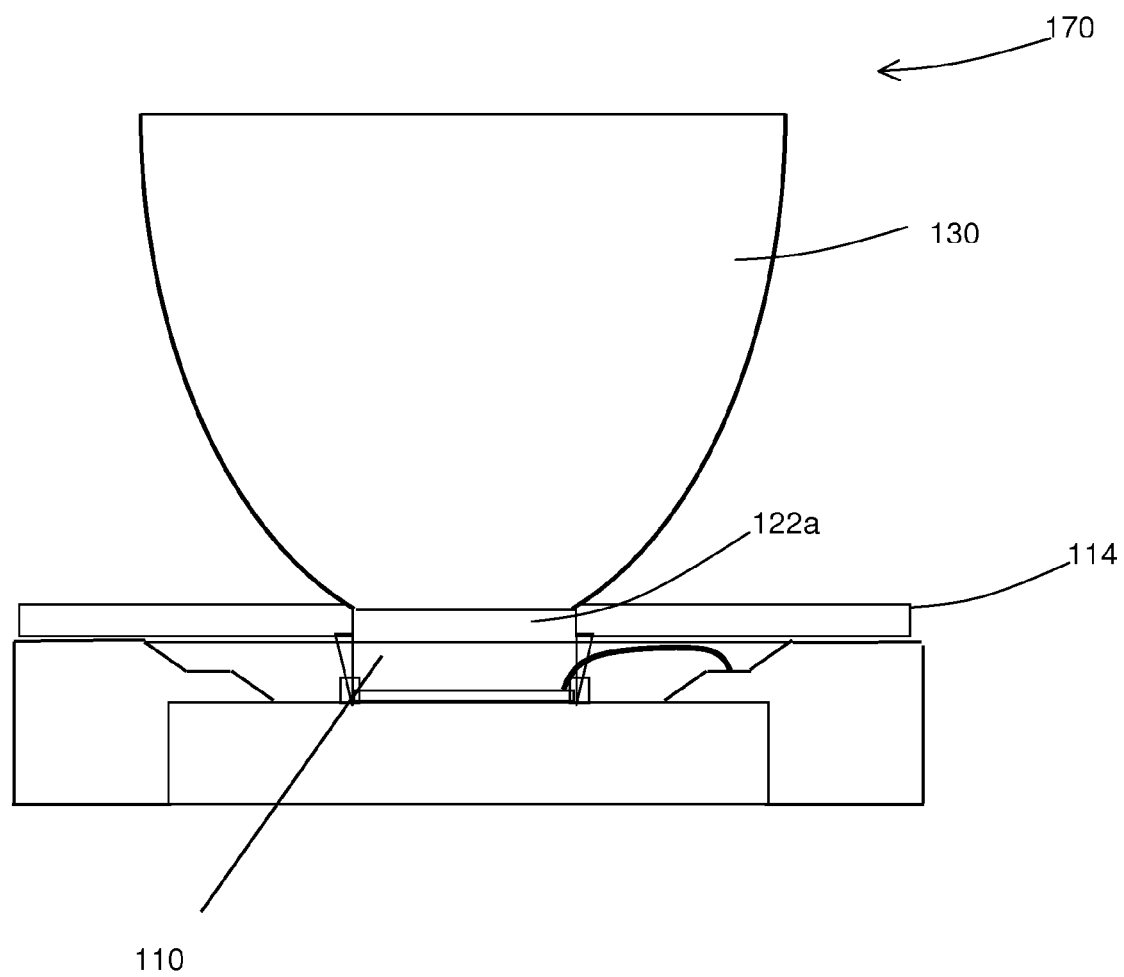
FIG. 2 illustrates a light collimation system that includes a coupler and a light source such as an LED according to another embodiment of the present invention.

FIG. 2 illustrates another embodiment of the present invention which uses a light coupler for efficient colleting and collimating of light from a light source such as an LED. The only difference from the coupler in FIG. 1 is that the portion of compound parabolic reflector 130 is a molded solid part made of a transparent material transparent to the light source. The high reflection of the solid portion of coupler has is achieved by total internal reflection (TIR). To further improve the light escape efficiency from the LED, the space between the reflector 130 and the transparent material 110 can be filled with a transparent material 122a with an refractive index matching that of the transparent material 110 or the reflector 130. The part of the light emitting from the LED 102 that is substantially perpendicular to its surface is directly applied to the compound parabolic TIR reflector and is collimated. The LED light that is substantially parallel to the LED chip surface strikes the light tunnel portion 114 and is guided into the parabolic TIR reflecting portion 130 through one or multiple reflections and is also collimated. Of course the light that is close to being perpendicular to the surface of the LED 102 will exit the coupler directly. The cross section of light tunnel should match the shape and size of 102 (which is normally a square). Because the light tunnel portion of the coupler can be much closer to the surface of the LED 102, large angle light from the LED 102 can be collected and collimated. This light collimating system 170 provides a high efficient collection and collimation output.

Figure 3:
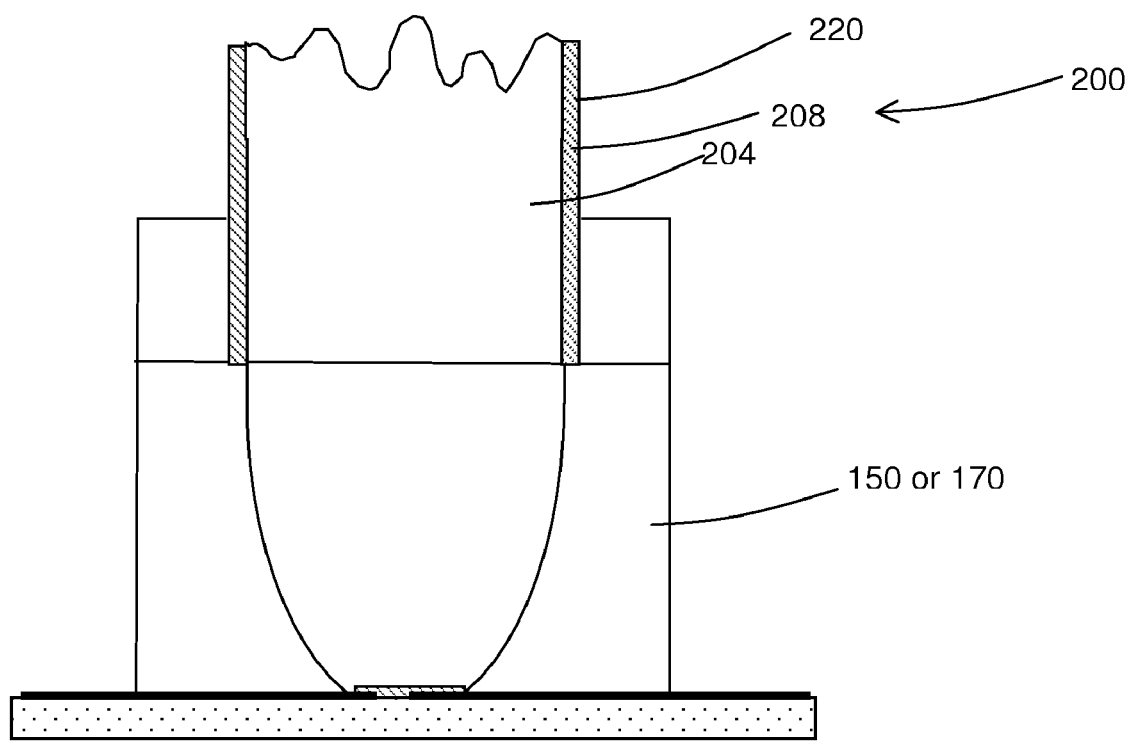
FIG. 3 illustrates the collimated light being coupling into a fiber or waveguide according to embodiments of the present invention.

In FIG. 3, a fiber coupled light illumination source system 200 is shown. A fiber 220 is directly butt coupled to the output of the light collimating system 150 or 170. This fiber has a large core 204 and cladding layer 208. The core 204 is in direct contact with the transparent material 122 in the system 150 or with the compound parabolic reflector 130 in the system 170. An index matching material can be filled in the contact gap to further improve the coupling efficiency. The fibered collimated light 200 has many benefits including easy beam delivery, low loss and uniform output.

Figure 4:
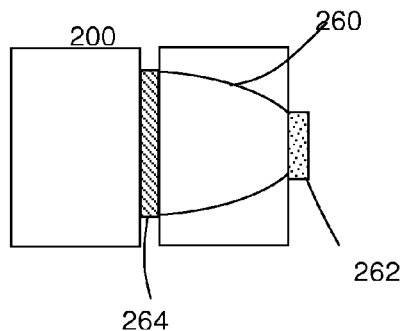
FIG. 4 illustrates a wavelength conversion system which includes collimated light, a fiber, a wavelength selective filter, a light concentrator and a wavelength conversion material layer.

FIG. 4 shows a cross section view of an embodiment of the invention using a directional wavelength conversion system. The collimated light from a fiber coupled light illumination source system 200 of FIG. 3 passes through a wavelength selective filter 264 and is focused by a light concentrator 260. A wavelength conversion layer 262 is placed at the focus plane of concentrator. The filter 264 can pass light of the first wavelength from the light illumination system 200 and reflect light generated by the wavelength conversion layer 262 having a second wavelength that is different from the first wavelength. This filter may be made by thin-film coating technology with multi-stacks dielectric material on a transparent substrate such as glass. The light concentrator 260 has an input port matching the fiber 220 from the illumination system 200 (usually in round shape). The output port of the light concentrator 260 is smaller than the input port to achieve a focusing capability. This concentrator may have a high reflective surface with a parabolic profile. The wavelength conversion layer 262 may be a phosphorescent material mixed with an optical transparent gel or epoxy. The phosphorescent material may be phosphors or quantum dots that absorb light of the first wavelength and emit light of the second wavelength. The thickness of the wavelength conversion layer and the phosphorescent material concentration can be pre-determined by the specific applications they are employed in. The light of the second wavelength converted by the wavelength conversion layer 262 can emit forward and backward with respect to the source light of the first wavelength. For the backward light, it will be reflected by the wavelength selective filter 264, focused back by the light concentrator 260, then pass through the wavelength conversion layer 262 and become forward light. Therefore, almost all the converted light ultimately propagates forward direction. This increases the light conversion efficiency comparing to the case without the wavelength selective filter 264. Compared to a structure with the wavelength conversion layer 262 directly deposit on the LED chip, which is the conventional method for LED wavelength conversion, the large physical separation of the wavelength conversion layer 262 from the light source in this system has many benefits including reduced thermal degradation of the wavelength conversion layer 262 and reduced thermal decrease of conversion efficiency when the LED chip heats up as the driving current increase.

Figure 5:
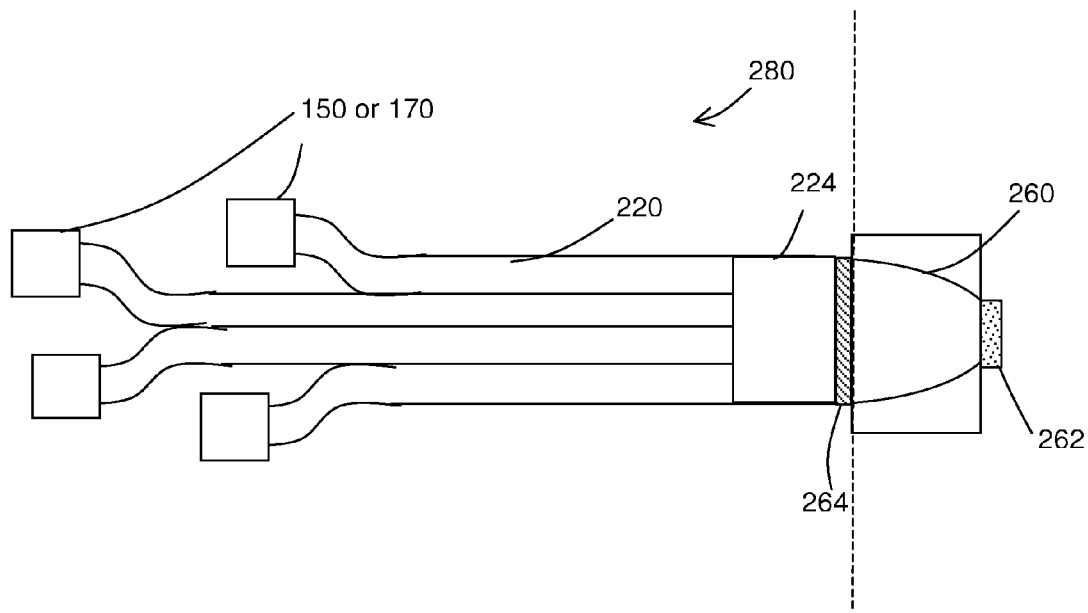
FIG. 5 illustrates a wavelength conversion system which includes multiple collimated light coupled into multiple fibers, a fiber combiner, a wavelength selective filter, a light concentrator and wavelength conversion material layer.

FIG. 5 shows a cross section view of another embodiment of the invention using a directional wavelength conversion system. Multiple collimated lights, each from a fiber coupled light illumination source system 200 of FIG. 3, are combined by a combiner 224. This combiner 224 can be a densely packed fiber bundle, a fiber core bundle or fused fibers. The combined light output from the combiner 224 passes through a wavelength selective filter 264 and is focused by a light concentrator 260. A wavelength conversion layer 262 is placed at the focus plan of concentrator. The filter 264 can pass light of the first wavelength from the light source 200 and reflect light generated by the wavelength conversion layer 262 having a second wavelength that is different from the first wavelength. This filter may be made by thin-film coating technology with multi-stacks dielectric material on a transparent substrate such as glass. The light concentrator 260 has an input port matching the fiber combiner 224. The output port of the light concentrator 260 is smaller than the input port to achieve a focusing capability. This concentrator may have a high reflective surface with parabolic profile. The wavelength conversion layer may be a phosphorescent material mixed with an optical transparent gel or epoxy. The phosphorescent material may be phosphors or quantum dots that absorb light of the first wavelength and emit light of the second wavelength. The thickness of the wavelength conversion layer and phosphorescent material concentration can be pre-determined by the specific applications they are employed in. The light of the second wavelength light converted by the wavelength conversion layer 262 can emit forward and backward with respect to the source light of the first wavelength. For the backward light, it will be reflected by the wavelength selective filter 264, focused back by the light concentrator 260, then pass through the wavelength conversion layer 262 and become forward light. This increases the light conversion efficiency compared to the case without the wavelength selective filter 264. Compared to a structure with the wavelength conversion layer 262 directly deposit on the LED chip, which is the conventional method for LED wavelength conversion, the large physical separation of the wavelength conversion layer 262 from the light source in this system has many benefits including single high brightness output with scalable output by simply adding more fibered LED units 200, reduced thermal degradation of the wavelength conversion layer 262 and reduced thermal decrease of conversion efficiency when the LED chip heats up as the driving current increase.

Figure 6:
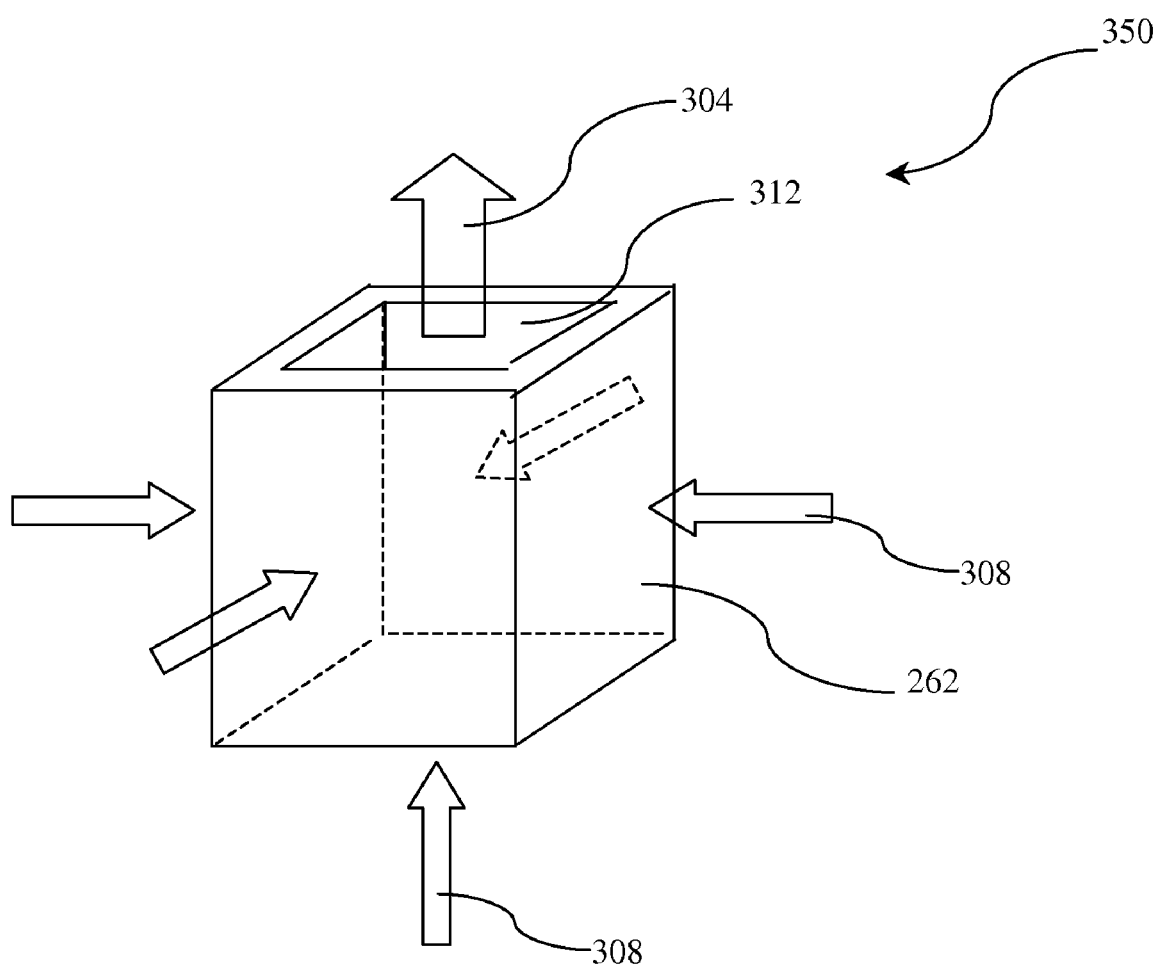
FIG. 6 illustrates a cavity with a wavelength conversion material layer according to another embodiment of the present invention.

FIG. 6 is a schematic diagram of one embodiment of the invention including a light cycling cavity made of wavelength conversions layers 262. In this embodiment, the cavity is a cube with five wavelength conversions layers 262 each having a square shape. Light 308 focused by light concentrators 260 of a single light source or multiple light sources (not shown in FIG. 6) directly strikes the sides of the cavity. One side of the cube is open to form an aperture 312 so that the converted light 304 can exit. The area of the aperture 312 is smaller than the 50% of the total inside area of the cavity.

Figure 7:
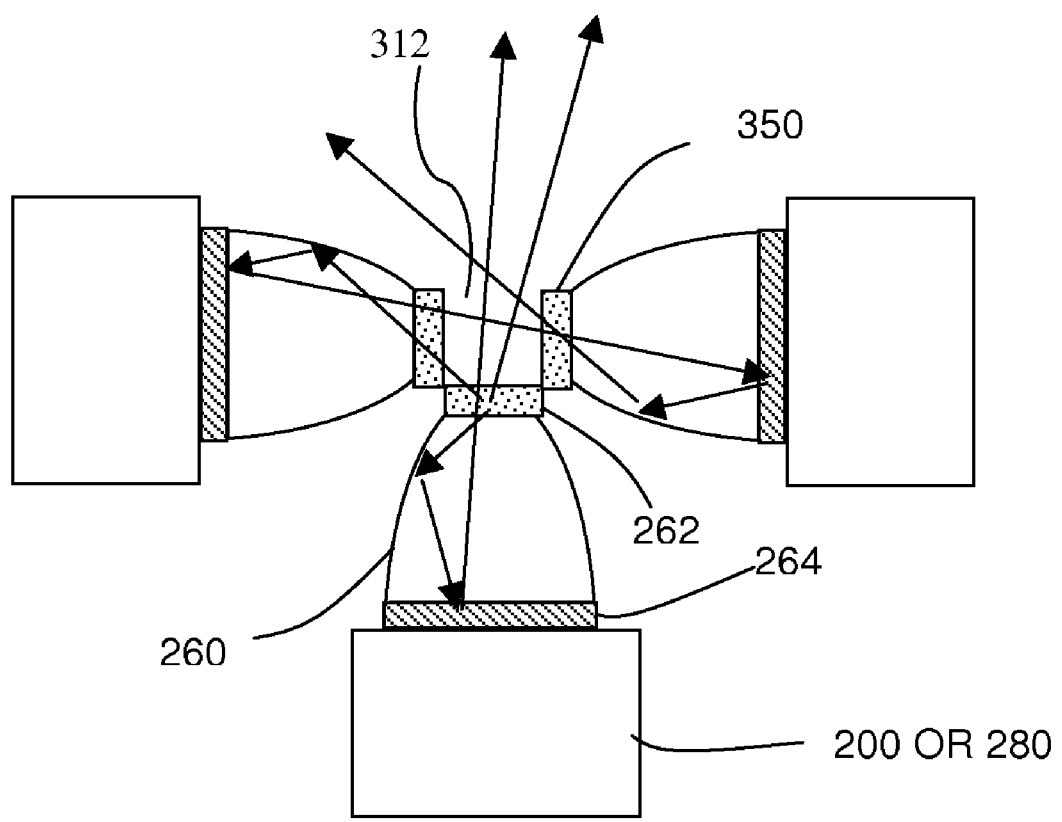
FIG. 7 illustrates an illumination system that has enhanced brightness through directional wavelength conversion. This system includes multiple collimated lights coupled into multiple fibers, a fiber combiner, a wavelength selective filter, a light concentrator and a cavity of wavelength conversion material layer with one aperture for the light to exit.

FIG. 7 is a schematic diagram of one embodiment of the invention which is a brightness enhancement illumination system. This system uses a cube with five wavelength conversions layers 262 having a square shape as that shown in FIG. 6. Each side of the cube is illuminated by a light focused by a concentrator 260. The collimated light from the source 200 for single light source or 280 for multiple light sources pass through a filter 264 which transmits light of the first wavelength. The converted light can exit the aperture 312 on the cube 350 directly. The light that does not exit directly passes through the wavelength conversion layers 262 and is reflected back to the cavity by the filter 264 and the concentrator 260. After several cycles, the light will eventually exit the aperture 312 on the cube 350. Therefore, the light generated from the five pieces of wavelength conversion material will exit from one side via the aperture of the cube. When the optical components loss is zero, the brightness of the output light can be five times of that of a single unit shown in FIG. 4 or FIG. 5. When the optical loss exists in the components, a brightness enhancement is still achieved.

It will be apparent to those skilled in the art that various modification and variations can be made in the illumination system using a light emitting diode array and wavelength conversion and the brightness enhancement method of the present invention without departing from the spirit or scope of the invention. Thus, it is intended that the present invention cover modifications and variations that come within the scope of the appended claims and their equivalents.

What is claimed is:

1. An optical illumination system comprising:
   one or more light sources each comprising one or more light emitting devices emitting light in a first wavelength range;
   coupling optics that collects and collimates the light from the light sources;
   one or more optical fibers or waveguides that couple the collimated light form each light source;
   a light cycling cavity having at least one aperture, the light cycling cavity being formed by a wavelength conversion layer that converts the light from the light sources in the first wavelength range into light in a second wavelength range that is different from the first wavelength range;
   a light selective filter that passes the collimated light in the first wavelength range and reflects the light in the second wavelength range; and
   optics for introducing the collimated light from the optical fibers or waveguides onto an outside surface of the light recycling cavity.

2. The optical illumination system of claim 1 wherein the coupling optics is a reflector having a compound parabolic portion that collects the light from the light source and generates exiting light that is substantially perpendicular to a surface of the light source, and a light tunnel portion that collects the light from the light source that is substantially parallel to the surface of the light source and guides it into the parabolic reflecting portion through one or multiple reflections.

3. The optical illumination system of claim 2 wherein the light tunnel portion has a cross section matching a shape of the light source.

4. The optical illumination system of claim 2 wherein the light tunnel portion has a high reflective coating.

5. The optical illumination system of claim 2 wherein the compound parabolic portion is a molded solid transparent part capable of total internal reflection (TIR) or molded hallow parts with a high reflection coating on its inner surface.

6. The optical illumination system of claim 2 wherein the light tunnel portion has an open slot for bonding wires of the light source.

7. The optical illumination system of claim 1 wherein the light source is an LED chip.

8. The optical illumination system of claim 1 wherein the light selective filter is placed at an entrance port of the light concentrator.

9. The optical illumination system of claim 1 wherein the light conversion layer is placed at an exit port of light concentrator.

10. The optical illumination system of claim 1 wherein the light concentrator focuses the collimated light at its exit port.

11. The optical illumination system of claim 1 wherein the light concentrator has a compound parabolic reflecting surface and its exit port has a square or rectangular shape.

12. The optical illumination system of claim 1 wherein the aperture of the light cycling cavity has an area smaller than a half of a total inside area of the cavity.

13. The optical illumination system of claim 1 wherein the light cycling cavity has a cubic shape with five sides being square shaped layers of the wavelength conversion material.

14. The optical illumination system of claim 13 wherein the light cycling cavity has one open side as the aperture.

15. The optical illumination system of claim 1, further comprising:
   a multiple fiber combiner that combines output light from the optical fibers or waveguides into one output light using dense fiber bundling or fiber fusion.

16. The optical illumination system of claim 15, wherein the light selective filter is place at an output of fiber combiner.

17. An illumination device, comprising:
   a plurality of light emitting devices each emitting light in a first wavelength range;
   a light selective filter that transmits light in the first wavelength range and reflects light in a second, different wavelength range, the light selective filter placed in an optical path of the light from the light emitting devices;
   a light concentrator placed in the optical path to receive transmitted light through the light selective filter from the light emitting devices, the light concentrator configured to focus the light at a plane displaced from the light concentrator; and
   a wavelength conversion layer placed at the plane to receive the focused light from the light selective filter and the light concentrator, the wavelength conversion layer operable to absorb light in the first wavelength range and to emit light in the second wavelength range, wherein the light selective filter is located between the light emitting devices and the wavelength conversion layer to reflect light in the second wavelength range towards the wavelength conversion layer.

* * * * *